(12) United States Patent
McSherry (10) Patent No.: US 7,512,587 B2
(45) Date of Patent: Mar. 31, 2009

(54) EFFICIENT COMPUTATION OF WEB PAGE RANKINGS

(75) Inventor: Frank David McSherry, San Francisco, CA (US)

(73) Assignee: Microsoft Corporation, Redmond, WA (US)

(*) Notice: Subject to any disclaimer, the term of this patent is extended or adjusted under 35 U.S.C. 154(b) by 491 days.

(21) Appl. No.: 10/882,970

(22) Filed: Jul. 1, 2004

(65) Prior Publication Data

US 2006/0004811 A1    Jan. 5, 2006

(51) Int. Cl.
*G06F 17/30* (2006.01)
*G06F 15/16* (2006.01)

(52) U.S. Cl. ............ 707/2; 707/5; 707/7; 709/201

(58) Field of Classification Search .......... 707/7, 707/2, 5; 709/201
See application file for complete search history.

(56) References Cited

U.S. PATENT DOCUMENTS

| | | | | |
|---|---|---|---|---|
| 6,112,202 | A * | 8/2000 | Kleinberg ............... | 707/5 |
| 6,122,628 | A | 9/2000 | Castelli et al. ............ | 707/5 |
| 6,285,999 | B1 * | 9/2001 | Page ..................... | 707/5 |
| 2005/0033742 | A1 * | 2/2005 | Kamvar et al. ........... | 707/7 |

OTHER PUBLICATIONS

S. Chien, C. Dwork, R. Kumar and D. Sivakumar, "Towards exploiting link evolution" presented at Workshop on Algorithms and Models for the Web Graph, 2001. (Provided by Applicant).*

D. Kempe and F. McSherry, "A Decentralized Algorithm for Spectral Analysis", ACM: Jun. 2004, pp. 561-568.*

Shi et al., "Distributed Page Ranking in Structured P2P Networks", Proceedings 2003 International Conference on Parallel Processing, Kaohsiung, Taiwan, Oct. 6-9, 2003, pp. 1-8, accessed online <research.microsoft.com/users/shumings/DPR_ICPP03.pdf>, accessed date Mar. 20, 2008.*

Sepandar D. Kamvar, Taher H. Haveliwala, and Gene H. Golub, "Adaptive Methods for the Computation of PageRank", *Linear Algebra and its Applications, Special Issue on the Numerical Solution of Markov Chains*, Nov. 2003, pp. 31-44.

Page, Lawrence; Brin, Sergey; Motwani, Rajeev; Winograd, Terry. "The PageRank Citation Ranking: Bringing Order to the Web", Nov. 1999, http://dbpubs.stanford.edu/pub/1999-66.

S. Chien, C. Dwork, S. Kumar, and D. Sivakumar, "Towards exploiting link evolution" presented at *Workshop on Algorithms and Models for the Web Graph*, 2001, accessed online from http://www.almaden.ibm.com/cs/people/siva/papers/linkevol.ps on Jun. 29, 2004.

* cited by examiner

*Primary Examiner*—Charles Rones
*Assistant Examiner*—Phuong-Thao Cao
(74) *Attorney, Agent, or Firm*—Woodcock Washburn LLP (57) ABSTRACT

Methods and systems are provided for efficiently computing page rankings of web pages or other interconnected objects. The rankings are produced by efficiently computing a principal eigenvector of a page ranking transition matrix. The methods and systems provided herein can be used to produce page rankings in a distributed and/or incremental manner, and can be used to allocate computing resources to processing page rankings for those pages that most demand them.

14 Claims, 9 Drawing Sheets

PAGE 1

Link to Page 2
.....
.....
Link to Page 3
.....
.....
Link to Page 4

301

PAGE 2

Link to Page 1
.....
.....
.....
.....
Link to Page 4

302

PAGE 3

.....
Link to Page 4
.....
.....

303

PAGE 4

.....
.....
Link to Page 1
.....
.....
Link to Page 2

304

PAGE 5

.....
Link to Page 3
.....
.....
Link to Page 4
.....

EFFICIENT COMPUTATION OF WEB PAGE RANKINGS

FIELD OF THE INVENTION

This invention pertains generally to the field of Internet searching and more particularly ranking web pages via matrix computations.

BACKGROUND OF THE INVENTION

The Internet presently comprises billions of web pages interconnected via hyperlinks. Users of the Internet typically use web browsing applications ("browsers") to navigate among these pages by either selecting and clicking hyperlinks, or by manually entering a "Uniform Resource Locator" ("URL") which allows the browser to access a particular web page directly. Often times, however, a user wishes to search the Internet for pages containing particular items of information. Because of the size of the Internet, it is impractical for a user to manually browse the Internet searching for relevant pages. Instead, users typically invoke search engines, which are computer applications developed for the purpose of searching the Internet. Search engines typically reside on server computing devices and accept queries from client users. A search engine is usually associated with an index of web pages, and, in response to a user query, returns a list of pages satisfying the query.

Some modern search engines rank web pages in order to provide users with more relevant results. Many search engines represent the interconnection of web pages via a matrix, and finding a page ranking equates to finding the principal eigenvector of the matrix. Such a search engine is described by Page et al. in "The PageRank citation ranking: Bringing order to the web," *Stanford Digital Libraries Working Paper*, January 1998, which is hereby incorporated by reference in its entirety for all that it teaches without exclusion to any part thereof. Generally, an iteration takes a ranking of the web pages and propagates it across the interconnection matrix, to obtain an updated ranking for the pages. Eventually, the rankings for all pages converge to fixed values, which are the entries of the principal eigenvector. This is equivalent to calculating the stationary distribution of a Markov chain. Due to the size of the matrices, computing the eigenvector—and thus the page ranks—is a computationally intensive task in existing systems, requiring several iterations of matrix manipulation before values for all pages converge to the eigenvector.

In order to compute the page rank more efficiently, researchers have attempted to exploit particular mathematical properties of the interconnection matrix in order to find methods of computing or approximating page rankings more quickly. One such method is described by Kamvar, et al. in, "Adaptive Methods for the Computation of PageRank," in *Numerical Solution of Markov Chains*, pp. 31-44, 2003, which is hereby incorporated by reference for all that it teaches without exclusion to any part thereof. Kamvar et al. note that, during the iterative process of finding the eigenvector, the page rankings converge quickly for some pages, but take longer for others. They provide a method to speed up the computation of page rankings by not computing page rankings for those pages that have apparently already converged, based on the assumption that when a page rank only slightly changes from one iteration to the next, that its rank will only slightly change in the future. Since a large percentage of the operations of calculating the stationary distribution include calculations when the changes are small, eliminating these calculations greatly increases the efficiency of the process. However, to address this possibility of "misconvergence", Kamvar et al. describe a heuristic method of pruning the link structure at every few iterations. Because their method is a heuristic, it cannot guarantee that presently small changes do not become large changes later. The method of Kamvar et al. does not converge monotonically, so that during computation, page rankings may move very little, and then very much—as a result, some updates to page rankings may be ignored to the detriment, resulting in inaccurate page rankings. The method of Kamvar et al. additionally requires processing the entire graph every few iterations, which can decrease overall performance. Furthermore, the method of Kamvar et al. requires the matrix multiplications to be performed sequentially—it does not allow for the iterated matrix multiplications to be performed in a distributed, asynchronous or incremental manner.

BRIEF SUMMARY OF THE INVENTION

Embodiments of the present invention provide methods and systems for computing page rankings more efficiently. Unlike previously known methods, methods embodied by the present invention do not rely on heuristics to address potential misconvergence. Instead, embodiments of the present invention maintain and store error information regarding all pages, including those that may have already apparently converged. Embodiments of the present invention allow for partial computation of rankings by selecting a subset of web pages and computing the influence of those pages on the page rankings of themselves and the other pages. By partitioning the web pages into several subsets, each subset's influence on the page rankings can be computed independently in a distributed process. The stored error information can then be reintroduced to the other subsets to update page rankings for those pages, assuring there is no misconvergence.

An embodiment of the invention provides a method of iteratively updating a ranking of one or more objects in a collection of interconnected ranked objects comprising, at each iteration, selecting a subset of the collection of objects, modifying the ranking for objects in the subset by removing errors, propagating the modification across the interconnection of objects, and storing as errors, for each object in the collection, the effect of the propagation on each object's ranking.

Another embodiment of the invention provides a computer-readable medium including computer-executable instructions facilitating the iterative updating of a ranking of one or more objects in a collection of interconnected ranked objects, computer-executable instructions executing the steps of, at each iteration, selecting a subset of the collection of objects, modifying the ranking for objects in the subset by removing errors, propagating the modification across the interconnection of objects, and storing as errors, for each object in the collection, the effect of the propagation on each object's ranking.

Still another embodiment of the invention provides a computer-readable medium including computer-executable instructions facilitating the ranking one or more objects from an interconnected collection of objects, the interconnection of the objects described by an interconnection description and the objects having an initial ranking description, computer-executable instructions executing the steps of initially computing an error description relative to the ranking description and the interconnection description, and repeatedly performing the steps of generating an iterative updater, updating the ranking description with the iterative updater, and updating the error description with respect to the interconnection description and the iterative updater.

In yet another embodiment of the invention, a method is provided for distributively updating a ranking of one or more objects in a collection of interconnected ranked objects comprising updating, by a first processor, rankings for objects in a first subset of the collection, transmitting, by the first processor, errors in the rankings of objects, and applying, by a second processor, the errors transmitted by the first processor to rankings for objects in a second subset of the collection.

In another embodiment of the invention, a system is provided for distributively updating a ranking of one or more objects in a collection of interconnected ranked objects comprising a first processing node for updating rankings of objects in a first subset of the collection, and a second processing node for updating rankings in a second subset of the collection, wherein the first processing node transmits to the second processing node errors introduced by its updating of the rankings.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE INVENTION

The methods and systems to efficiently compute page rankings will now be described with respect to preferred embodiments; however, the methods and systems of the present invention are not limited to computing page rankings of web pages. Moreover, the skilled artisan will readily appreciate that the methods and systems described herein are merely exemplary and that variations can be made without departing from the spirit and scope of the invention.

The present invention will be more completely understood through the following detailed description, which should be read in conjunction with the attached drawings. In this description, like numbers refer to similar elements within various embodiments of the present invention. The invention is illustrated as being implemented in a suitable computing environment. Although not required, the invention will be described in the general context of computer-executable instructions, such as procedures, being executed by a personal computer. Generally, procedures include program modules, routines, functions, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices. The term computer system may be used to refer to a system of computers such as may be found in a distributed computing environment.

Figure 1:
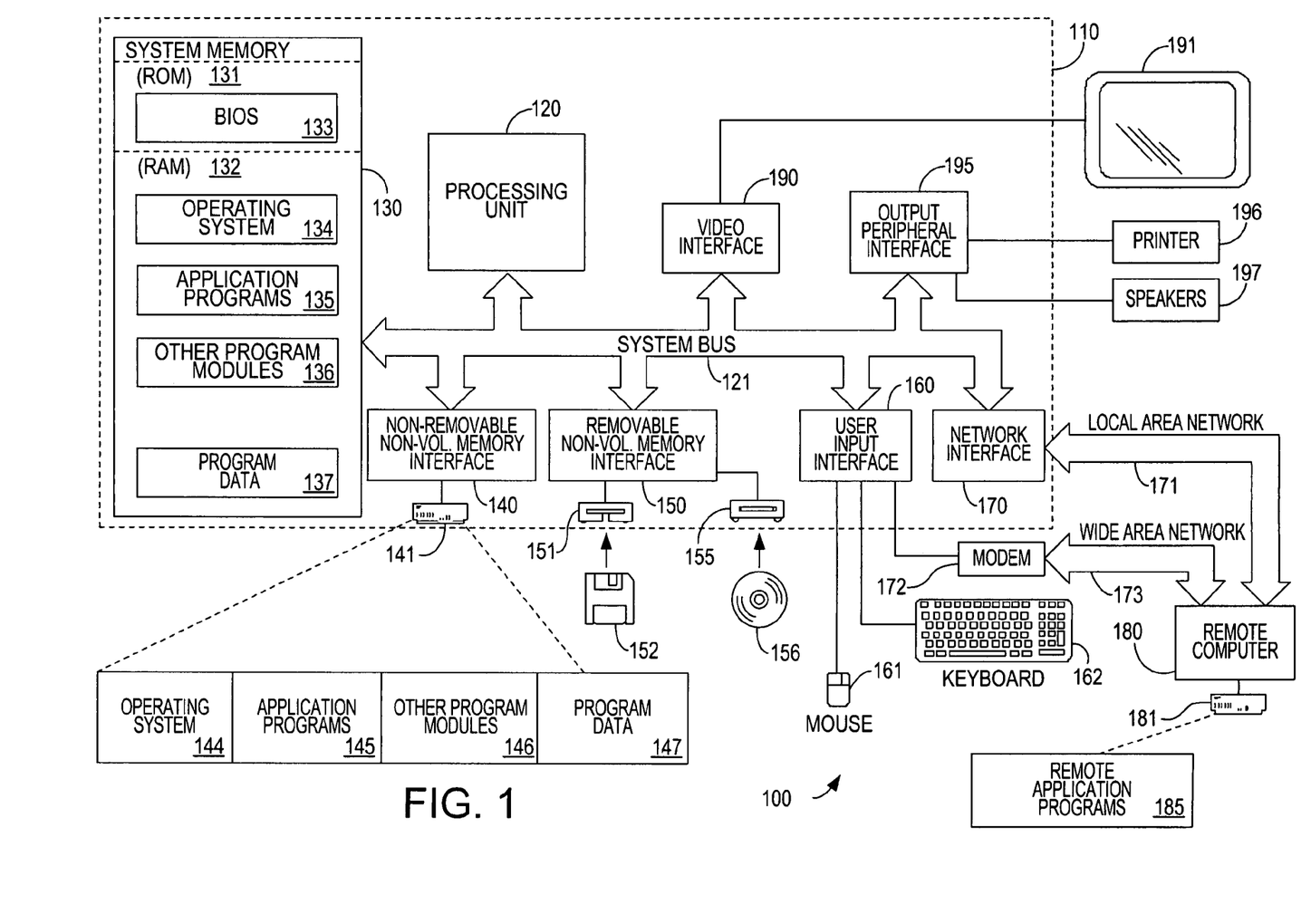
FIG. 1 is a simplified schematic illustrating an exemplary architecture of a computing device for carrying out web page ranking and searching, in accordance with an embodiment of the invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100. Although one embodiment of the invention does include each component illustrated in the exemplary operating environment 100, another more typical embodiment of the invention excludes non-essential components, for example, input/output devices other than those required for network communications.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer readable media. Computer readable media can be any available media that can be accessed by the computer 110 and includes both volatile and nonvolatile media, and removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a tablet, or electronic digitizer, 164, a microphone 163, a keyboard 162 and pointing device 161, commonly referred to as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 197 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. For example, in the present invention, the computer 110 may comprise the source machine from which data is being migrated, and the remote computer 180 may comprise the destination machine. Note however that source and destination machines need not be connected by a network or any other means, but instead, data may be migrated via any media capable of being written by the source platform and read by the destination platform or platforms.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Figure 2:
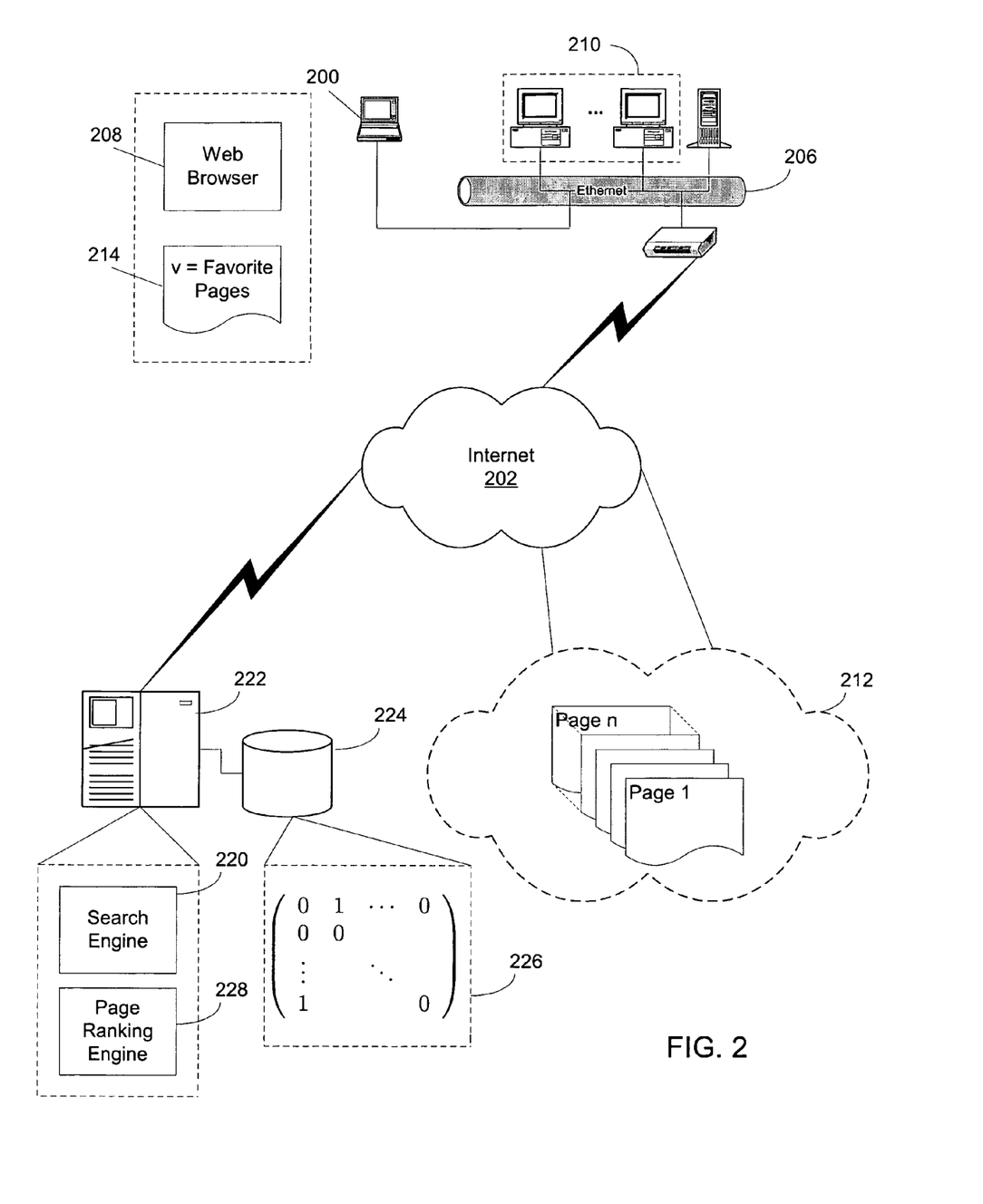
FIG. 2 is a diagram illustrating an arrangement of computing devices connected to the Internet for carrying out web page ranking and searching, in accordance with an embodiment of the invention.

Turning to FIG. 2, a simple example of a computing environment is depicted wherein the invention is potentially exploited. In the illustrative environment, a computer 200 includes a network interface card (not specifically shown) facilitating communications over a communications medium. In the particular example depicted in FIG. 2, the computer 200 communicates with a local area network 206 via physical connection. Alternatively, the computer 200 could communicate with the local area network 206 via WWAN or WLAN media, or via other communications media.

The user of the computer 200, as a result of the supported network medium, is able to access the Internet 202. For example, the computer 200 accesses resources on the LAN 206 directly via physical connection to the LAN 206. The LAN 206 in the illustrative example is assumed to include network access and proxy servers that enable a properly authenticated user of the computer 200 to access resources of the Internet 202.

The Internet 202 is presented to the user of the computer 200 in the form of web pages. A web page contains content and instructions to be processed and displayed by a web browser application 208 residing on the computer 200. Alternatively, the web browser application 208 resides on a networked computer 210, and is graphically displayed on the computer 200 via a remote display program. Web pages also contain hyperlinks to other web pages, allowing a user to easily navigate from a displayed page to related pages by selecting a presented hyperlink. In this way, the hyperlinks on pages create a "web" of interconnected pages, whereby a user can navigate from one page to any of millions or billions of pages by a series of hyperlink selections. Although there may be several billion interconnected web pages accessible over the Internet 202, it is useful for purposes of the present invention to consider the pages as an ordered set of pages 212 numbered 1 to n, where n is the total number of pages accessible on the interconnected network of web pages. To aid users in keeping track of interesting web pages, web browser applications, can contain a "Favorites" or "Bookmarks" feature 214, whereby the user is able to store a list of web pages he is likely to access frequently, enabling easy navigation to those pages in the future.

Although a user is able to navigate to web pages merely by selecting hyperlinks, tools such as search engines exist to aid the user in finding particular information contained in web pages. In a typical scenario, the search engine 220 is housed in a server 222 connected to the Internet 202, and is also connected to a database 224 containing indices and information 226 about web pages on the Internet. In a typical search engine, the user is presented with a web page on which he enters search parameters, usually in the form of search terms. The search engine 220 uses its database 224 to process the user request and in turn present the user with a new web page containing links to other pages that satisfied the parameters of the user's request.

When a large number of pages satisfy the search parameters, presenting the search results to the user in an organized manner may be problematic. A list of thousands of web pages in no particular order forces the user to painstakingly manually sort through the entire list to find relevant pages. Therefore, modern search engines often grade or "rank" pages based on presumed relevance to the user by using, for example, an incorporated page ranking engine 228. The web pages satisfying the search can then be sorted by presumed relevance, so that the user is presented with the most relevant results at the top of the result list.

Figure 3:
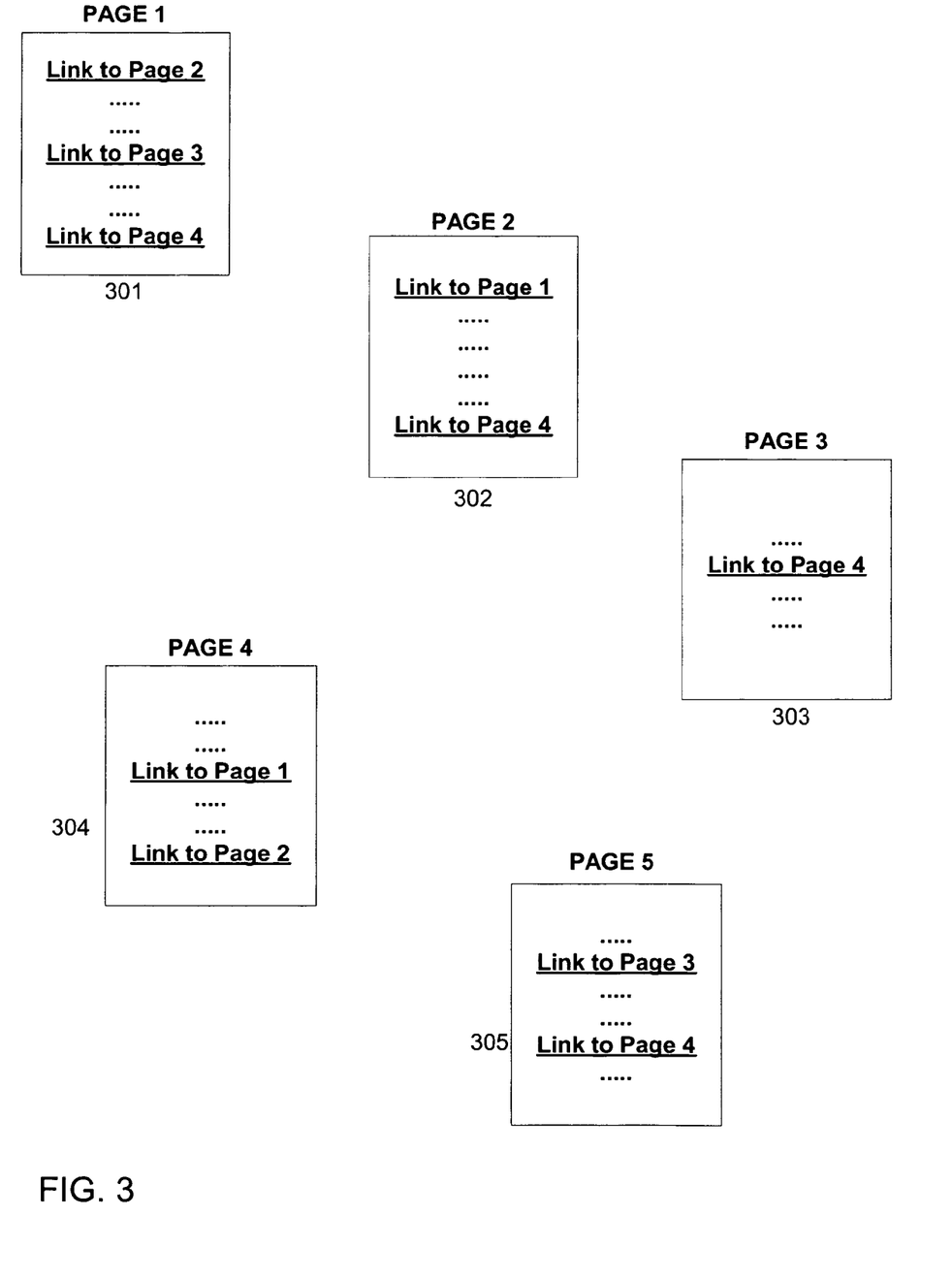
FIG. 3 is an example illustrating a collection of web pages, in accordance with an embodiment of the invention.

Determining the relevance of any particular web page, however, is not a trivial task. One approach to determining relevance looks at the structure of interconnectivity amongst pages on the Internet, to discover which pages are "popular" in that many other web pages contain hyperlinks leading to that page. The structure of interconnectivity can be stored on the database connected to the search engine in the form of a matrix, where entry [i,j] in the matrix indicates the presence of a hyperlink from page j to page i. An example of a connectivity matrix used to describe the interconnectivity among web pages, as used in an embodiment of the present invention, is now described with reference to FIG. 3. The universe of web pages in the example of FIG. 3 consists of only five web pages, for illustrative purposes. Page1 301 contains hyperlinks to page2 302, page3 303 and page 4 304. Page2 302 contains hyperlinks to page1 301 and page4 304. Page3 303 contains only one hyperlink to page4 304. Page4 contains hyperlinks to page1 301 and page2 302. Page5 contains hyperlinks to page3 303 and page4 304. In the example, this interconnectivity is described by the matrix $$\begin{pmatrix} 0 & 1 & 0 & 1 & 0 \\ 1 & 0 & 0 & 1 & 0 \\ 1 & 0 & 0 & 0 & 1 \\ 1 & 1 & 1 & 0 & 1 \\ 0 & 0 & 0 & 0 & 0 \end{pmatrix}$$

where an element at row i, column j is 1 if an only if there is link from page j to page i. If a hyperlink is chosen uniformly at random from a page, then there is a corresponding probability $p(i,j)$ of going from page j to page i when a hyperlink is chosen. The corresponding random walk transition matrix A is:

$$A = \begin{pmatrix} 0 & 0.5 & 0 & 0.5 & 0 \\ 0.33 & 0 & 0 & 0.5 & 0 \\ 0.33 & 0 & 0 & 0 & 0.5 \\ 0.33 & 0.5 & 1 & 0 & 0.5 \\ 0 & 0 & 0 & 0 & 0 \end{pmatrix}.$$

The sum of each column of matrix A equals 1. The present invention is not limited, however, to choosing a hyperlink uniformly at random within a page. Any arbitrary probability distribution may be applied to the choosing of hyperlinks within any particular page. For example, if statistical data is known about actual usage patterns, that information can be applied in assigning the probabilities contained in A.

Given that the Internet currently comprises billions of pages, and the vast majority of these pages do not contain hyperlinks between them, matrix A as used in practice outside this example will be a sparse matrix containing mostly zero-entries. The sparseness property is useful because it allows for compression techniques to store the matrix efficiently. In addition to sparseness, another important matrix concept is the "rank" of a matrix, a mathematical term unrelated to a web page's "pagerank" or "rank" of an individual web page. The rank of a matrix is the number of linearly independent columns (or rows) of the matrix. For practical purposes, matrices of lower rank can be stored more efficiently than matrices of higher rank—a n×n matrix of rank-k contains information requiring on the order of kn storage, rather than the order of $n^2$ storage potentially required by a matrix of rank-n.

Alternatively, the connectivity among the pages may be considered in the form of a graph containing vertices and directed edges. In this manner, each vertex represents a web page, and each directed edge represents a hyperlink between pages. By assigning weights to the edges, a probability distribution among a page's hyperlinks can be represented.

Figure 4:
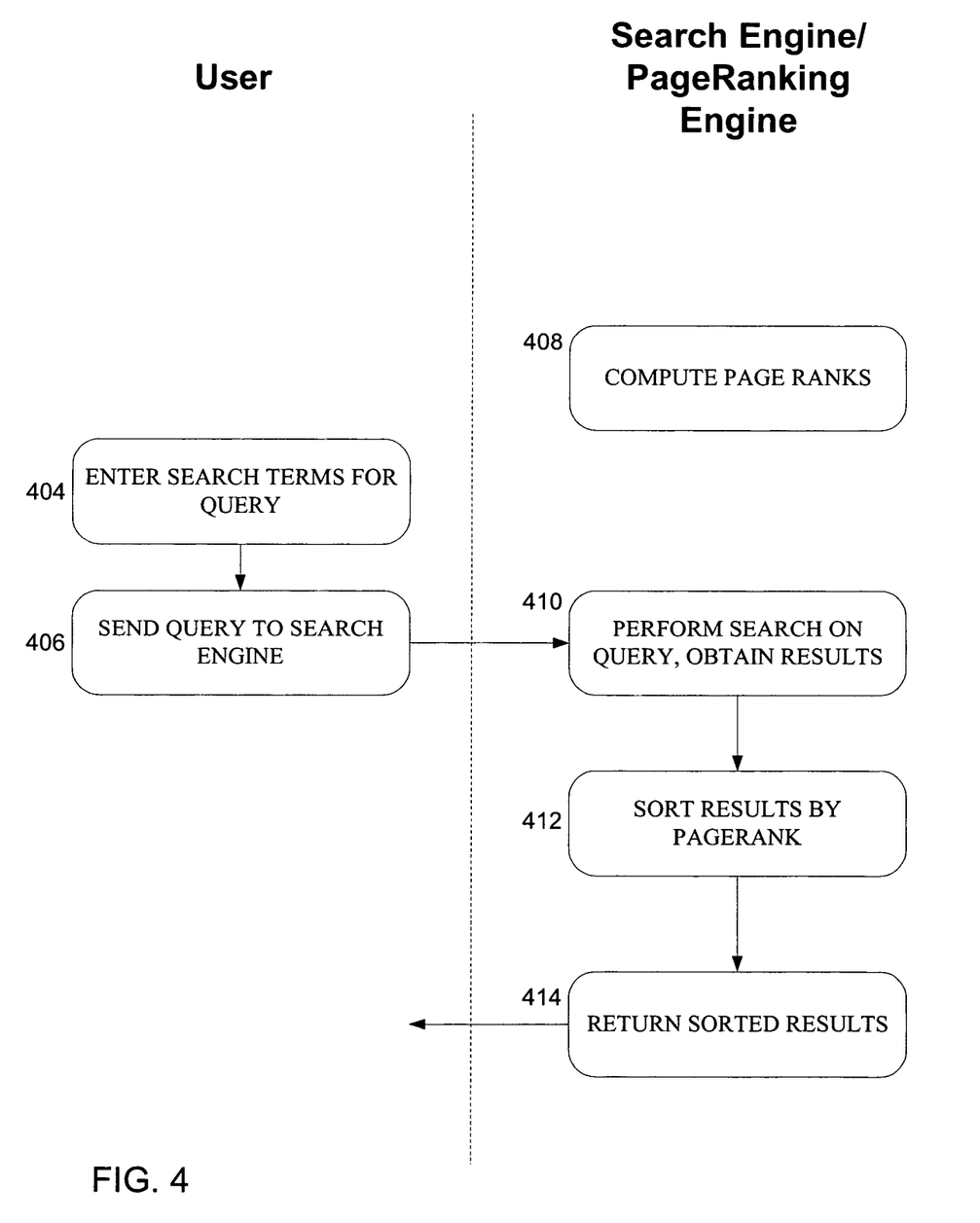
FIG. 4 is a flow diagram illustrating a method of ranking results of a search query, in accordance with an embodiment of the invention.

Turning to FIG. 4, in one embodiment, the user enters search terms at step 404 and sends the query to the search engine at step 406. A page ranking engine, prior to receiving the query, has computed page ranks for pages at step 408 based on the interconnectivity (and possibly other statistical data) of web pages on the Internet. After receiving the query, the search engine performs the search on the given search terms and obtains the results at step 410. The search engine then sorts the results by pagerank at step 412. The sorted results are returned to the user at step 414.

Several existing methods for ranking web pages utilize the notion of a theoretical "random walk" among the web pages of the Internet. Generally, a random walk can be thought of as starting at some web page k and then selecting a hyperlink to page j with some probability A[j,k]. The walk continues from page j by selecting a hyperlink to another page i, with some probability A [i,j]. The theoretical random walk continues indefinitely. By performing mathematical manipulations on the random walk transition matrix A, a search engine can rank a page based on the probability of arriving at the page at a step of the random walk. To avoid being trapped in a "dead-end" or a small set of internally linked pages, some existing methods for ranking pages include a constant reset factor c. At each step of the walk, there is a probability c of jumping to any random page of the Internet. This "teleportation" feature ensures that the walk will eventually continue despite hitting a dead-end. The choice of c is important, however, since a very small reset factor has little impact on the random walk, while too large of a reset factor results in too many jumps, ignoring the structure of interconnections among the pages. Empirically, an approximate value of c=0.15 (about a one in six chance of resetting) has been found to produce satisfactory results in real-world test environments. The random walk among the pages can thus be considered mathematically as a Markov chain.

More generally, a distribution d on the web pages is used to allow some web pages to be more likely reset targets than others. That is, d[i] is the probability that, given the random walk is teleporting, the random walk resets to page i. In some embodiments, the distribution d is used for personalizing user preferences, so that a page ranking transition matrix P for one user results in different page rankings from the page ranking transition matrix for a user with different preferences. Scaling the transition matrix A by (1−c) and scaling d by c, the values of the scaled A and d can be combined into a single page ranking transition matrix, P:

$$P = A + d[1]_n$$

where $[1]_n$ is the all-ones row vector of dimension n.

Existing page ranking algorithms compute the page rank of a page by computing the stationary distribution of the Markov chain represented by P, which corresponds to the principal eigenvector of P. A typical method of computing the principal eigenvector is through a PowerIteration process, in which some initial vector x is arbitrarily chosen, and $P^i x$ is computed for large values of i. The terms of this series converge to the principal eigenvector, e, where e[j] is the page rank of web page j.

Computing $P^i x$ by existing methods is a computationally and resource intensive operation, since P is very large. However, an alternative way to view $P^i x$ is as follows:

$$P^i x = x + \sum_{j<i} P^{j+1} x - P^j x$$
$$= x + \sum_{j<i} P^j (Px - x)$$

Figure 5:
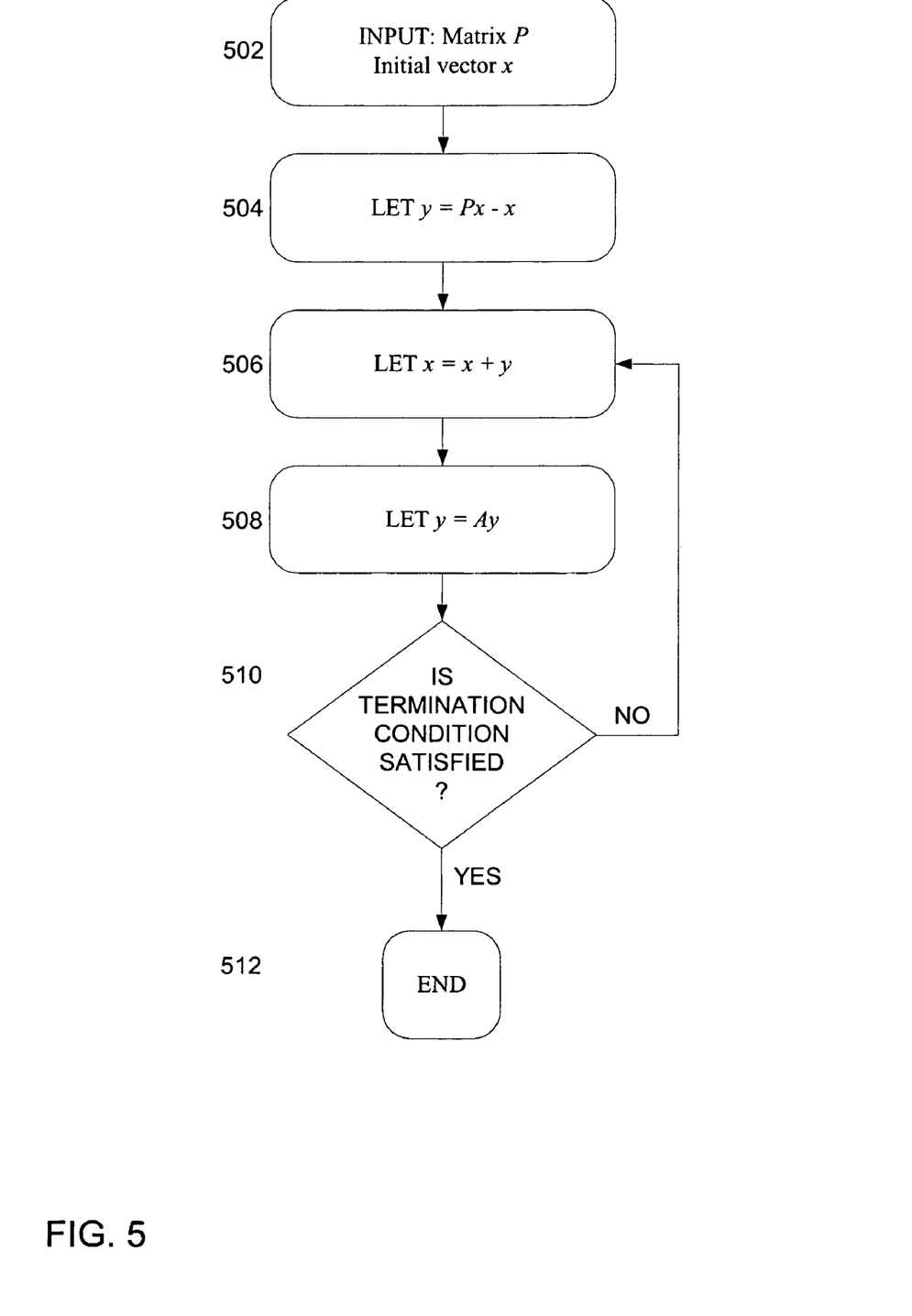
FIG. 5 is a flow diagram illustrating a method for computing a vector of page rankings, in accordance with an embodiment of the invention.

That is, $P^i x$ can be obtained by applying additive updates $P^j(Px-x)$ to a base vector x. As j increases, the values in these updates converge to zero, so if any update values appear small, they can be temporarily or permanently discarded. A method to obtain $P^i x$ in this manner is shown in FIG. 5. The method takes as input a page rank transition matrix P and an initial vector x at step 502. An update vector y is initially set to Px−x at step 504. At step 506, x is updated with y. At step 508, y is multiplied by the page transition matrix A to obtain a new vector y. A termination condition is checked at step 510, and the process either terminates at step 512, or returns for another iteration at step 506. To make this method even more efficient, one embodiment checks if y[i] is 0 for an update, and ignores row i of matrix A for the remainder of the computation. If y[i] is within some threshold of 0, it is treated as zero and subsequently ignored. This results in a good approximation of $P^i x$ and saves computational steps.

Figure 6:
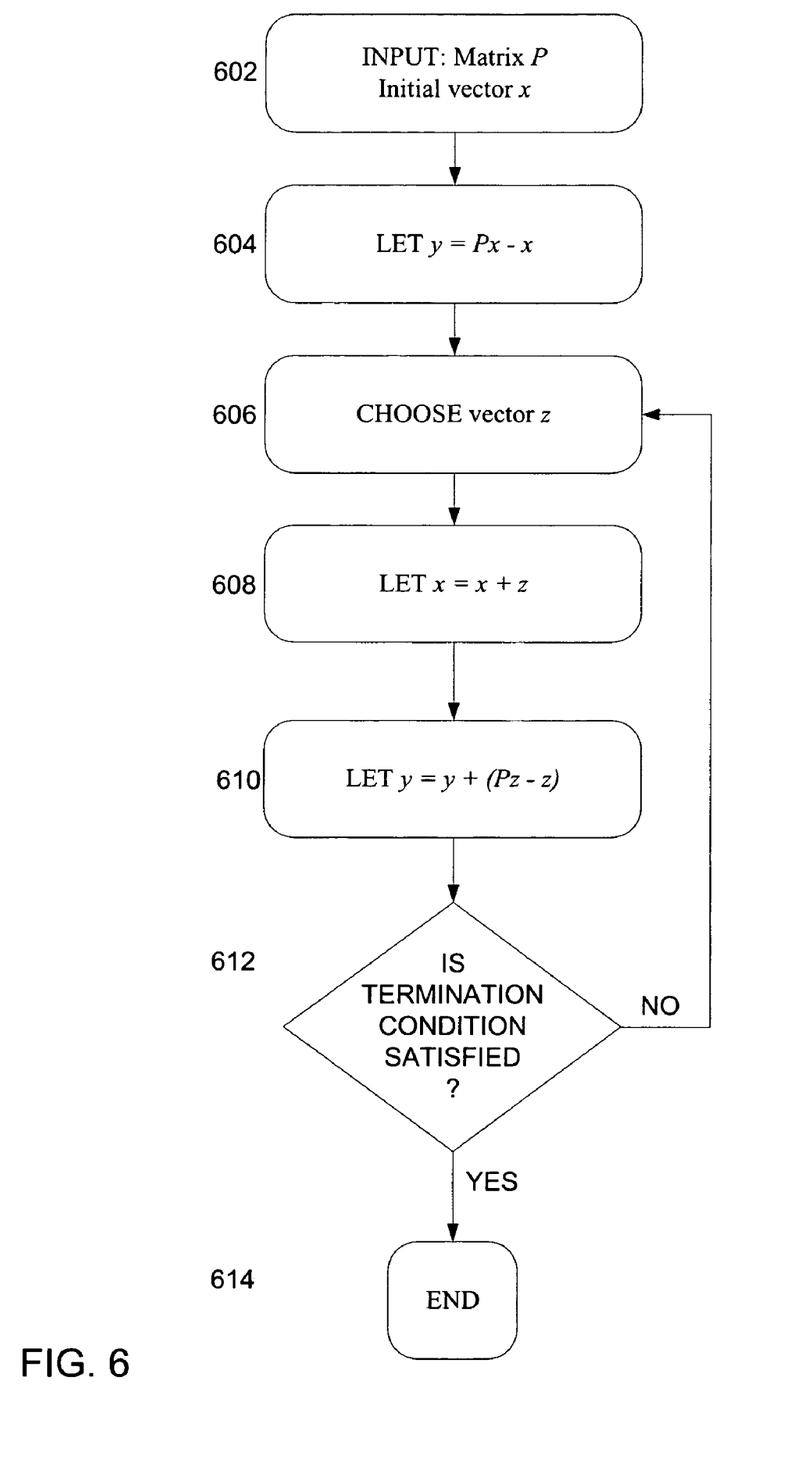
FIG. 6 is a flow diagram illustrating a method for computing a vector of page rankings, in accordance with an embodiment of the invention.

An additional method of approximating $P^i x$ does not discard entries of y with low values, but rather maintains them in a vector that can later be added to the approximation. This improves the quality of the approximation, since entries in y which are small on a current iteration may become significant relative to other entries at later iterations. The method is described with reference to FIG. 6. The method takes as input a page rank transition matrix P and an initial vector x at step 602. An update vector y is initially set to Px−x at step 604. The invariant property that y=Px−x is maintained throughout the method. At step 606, a vector z is chosen and z is added to x at step 608. To maintain the invariant property, y is updated by adding Pz−z to it at step 610. One embodiment of the method chooses z to minimize |Px−x|/|x|, resulting in a vector x that is nearly an eigenvector. A termination condition is checked at step 612, and the process either terminates at step 614, or returns for another iteration at step 606. Because of the invariant property, x can be thought of as the current approximation, and y is the current error to the approximation. At each iteration, z is chosen to re-allocate between the error and the approximation. This method is efficient since it does not need to perform many additions of insignificant values to the approximation, but instead can aggregate those values over several iterations until they become significant, and are then transferred to the approximation through the choice of z.

Figure 7:
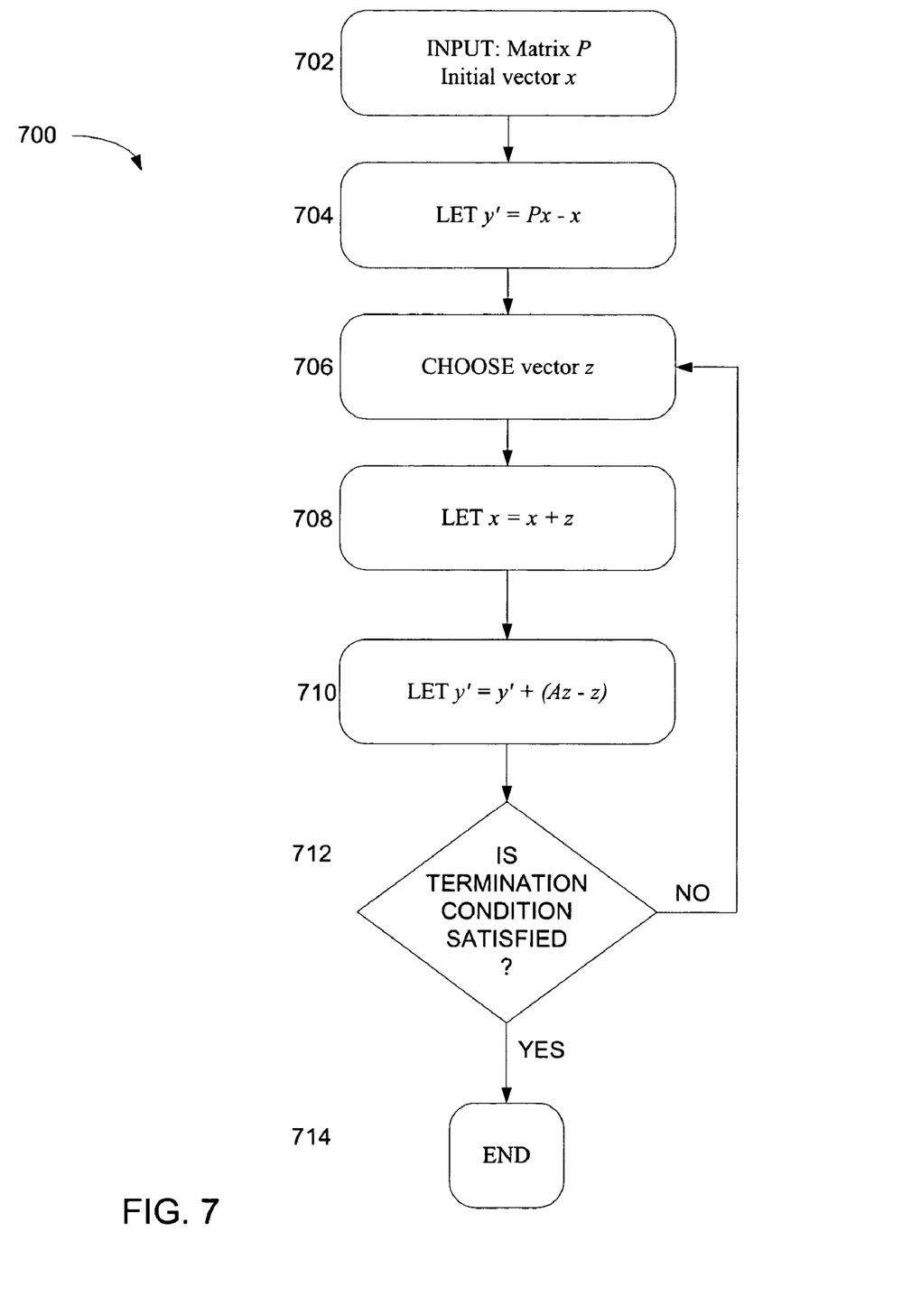
FIG. 7 is a flow diagram illustrating a illustrating a method for computing a vector of page rankings, in accordance with an embodiment of the invention.

Another method of approximating $P^i x$ is described with reference to FIG. 7. The method takes as input a page rank transition matrix P and an initial vector x at step 702. An update vector y' is initially set to Px−x at step 704. At step 706, a vector z is chosen and z is added to x at step 708. At step 708, y' is updated by adding Az−z to it. A termination condition is checked at step 710, and the process either terminates at step 712, or returns for another iteration at step 706. Because of the invariant property, x can be thought of as the current approximation, and y is the current error to the approximation. At each iteration, z is chosen to re-allocate between the error and the approximation. Like the method of FIG. 6, this method is efficient since it does not need to perform many additions of insignificant values to the approximation, but instead can aggregate those values over several iterations until they become significant, and are then transferred to the approximation through the choice of z. Unlike the method of FIG. 6, there is no invariant property that y'=Px−x to be maintained throughout the method. However, it can be shown mathematically that as y' converges to the 0 vector, the corresponding y converges to 0 as well, ensuring the x is the principal eigenvector. The vector z can thought of as a set of values proposed for propagation through A. The values are subtracted from y', but the effects of the propagation are reintroduced. Because the choice of z is arbitrary, and not dependent on x or y, the method of FIG. 7 provides advantages over previously known methods for computing page ranks of web pages: as long as y' is eventually brought to zero, any choice for z will work, allowing one to pick and choose the computation to be performed at that iteration. Choosing z judiciously yields significant improvements over previously known methods. Generally, the choice for each element z[u] of z is either zero or y[u]. If node u has a self-loop, such that a fraction f of z[u] is returned to y[u], then element z[u] is chosen to equal y[u]/(1−f). Alternatively, a value is chosen for element z[u] that is not equal to y[u] or zero; instead, a value is chosen for element z[u] in order to predict some amount of incoming error for node u.

One technique for choosing z is to choose a vector that consists of some elements of y, with the other positions zeroed out. This corresponds to processing the influence that a subset of selected web pages—those corresponding to the non-zeroed elements of y—have on the page rankings. Another approach for choosing z is to process only those pages with the most accumulated error in their rankings, i.e., those pages with the largest values of y[u]. As the application of the random walk transition matrix A causes a multiplicative decrease of 1−c for the processed entries, the largest absolute decrease per work performed is obtained by processing only the largest entries. Small entries can be deferred until their magnitude again becomes among the largest.

Yet another approach for choosing z is to process only pages corresponding to a local portion of the directed graph of web pages. Although processing the entire web graph requires reading volumes of data from disk, the graph can be broken into several small parts so that the majority of edges are intra-part. Restricting z to entries from a given part allows for multiple iterations to be performed over the same graph segment, keeping the edges in memory for the duration. As many links remain within the part, much of the mass of Az remains within the part. Performing another iteration with these values again decreases them by a factor of 1−c (the probability of teleporting to another web page). If all the error mass stays local, then all these pages can be processed until the error disappears entirely. However, some error is likely to drift away to other portions of the graph and become significant. At this point, the other portion of the graph is processed, adding the influence of that portion's pages to the page rankings.

Figure 8:
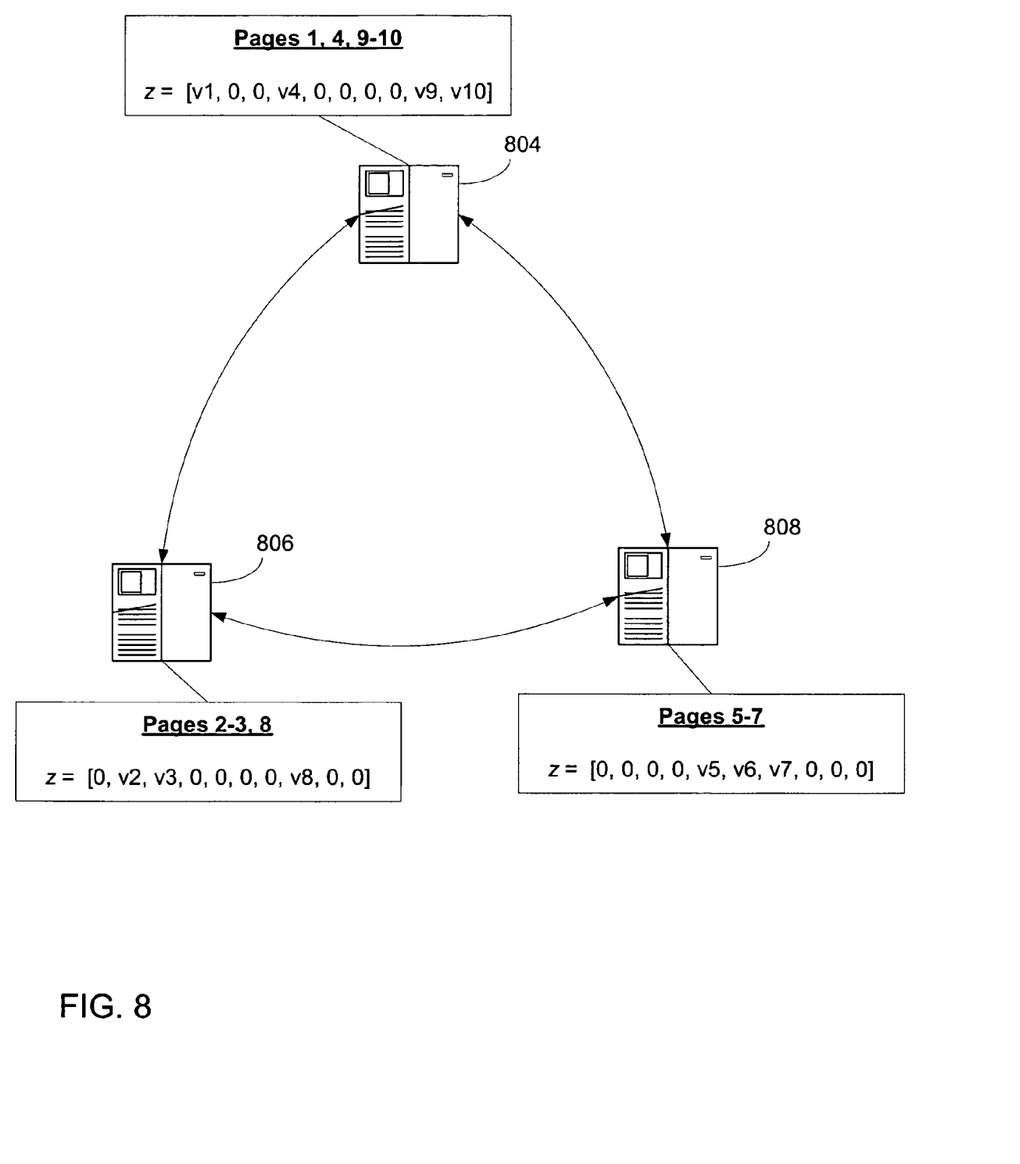
FIG. 8 is a diagram illustrating an arrangement of computing devices for carrying out distributed ranking of web pages, in accordance with an embodiment of the invention.

Still another approach for choosing z is suited to a distributed computing environment, where a collection of processing nodes work independently on local portions of the web graph, as described above. To decrease the number of transmission between computing nodes, a node processing a local portion of the web graph accumulates error information it generates regarding other regions, and transmits that error information to the appropriate computing node for that portion. An example of such a distributed computing environment is shown in FIG. 8. In the example, computing the page rankings for a web of ten web pages is distributed across three nodes. The first node 802 is responsible for computing the page rank of pages 1, 4, 9 and 10. It chooses a z vector with zeroes in all indices i except for when i=1, 4, 9 or 10. Similarly, a second node 804 is responsible for computing the page rank of pages 2-3 and 8. A third node 806 is responsible for computing the page rank of pages 5-7. Since the page rankings are stored in the x vector by the method of FIG. 7, and x is only updated by addition with z, each node will change the values of x on only those indices for which it is responsible. The y' for each node, however, is not so limited, since y' measures the influence of a page on the page rankings of other pages. At occasional intervals, a node sends its values of y' as an update to the other nodes. Upon receiving an update, a node adds the corresponding portion of the received y' to its own y'. More precisely, a node periodically sends to another node the values of y' corresponding to web pages for which the other node is responsible. In this way, nodes do not need to hurry to keep y' up to date. If y' is out of date, any choice of z may be chosen, causing no harm. When the correct y' terms arrive, they are incorporated to more precisely calculate page rankings, but no errors are introduced by their delay. The ability to continue updating page rankings before receiving all update values from other nodes is an improvement over previous page ranking systems, which required each node to wait until it received all update values before beginning a new iteration of processing.

The accumulation of updates is also applicable on single machines. In one embodiment, a processor iterates over a small set repeatedly, without updating the values of x and y in main memory. Instead, the processor keeps a small, coherent buffer and updates x and y only once, when it has finished processing this group.

Yet another approach is to process one page at a time. Although this is unlikely to return error mass to that page, it does have the property that the error from the page is immediately folded into y. In an embodiment of the invention, this results from modifying step 708 of the method described with reference to FIG. 7. When adding Az−z toy, instead of processing all entries of z and then folding those results back into y, as is done by traditional matrix multiplication techniques, embodiments of the invention process an individual entry z[u] and immediately fold the result back into y, making the result available for upcoming nodes. There is thus no need to wait for an entire multiplication iteration before the effects of the first element are found; instead, its error is immediately propagated, presumably many more times still before an iteration is complete.

If the page rank transition matrix P is known to be similar to a previously analyzed matrix Q, then the stationary distribution x' of Q is a good starting point for computing the stationary distribution x of P; if the changes that have occurred, described by matrix P−Q, are local, then most of the stationary probabilities will not have changed, so most of the entries in Px'−x' will be very small. To initially compute Px'−x', it can be shown mathematically that Px'−x' equals y+(P−Q)x, which is easy to compute since P−Q is assumed to be very sparse. Once Px'−x' is computed, the iterative process described in FIG. 7 continues. Thus, if a set of interconnections is incrementally added or removed from the universe of web pages, the resulting incremental difference in page rankings is relatively easy to determine using an existing page ranking, and does not require an expensive initial computation of Px'−x'.

Figure 9:
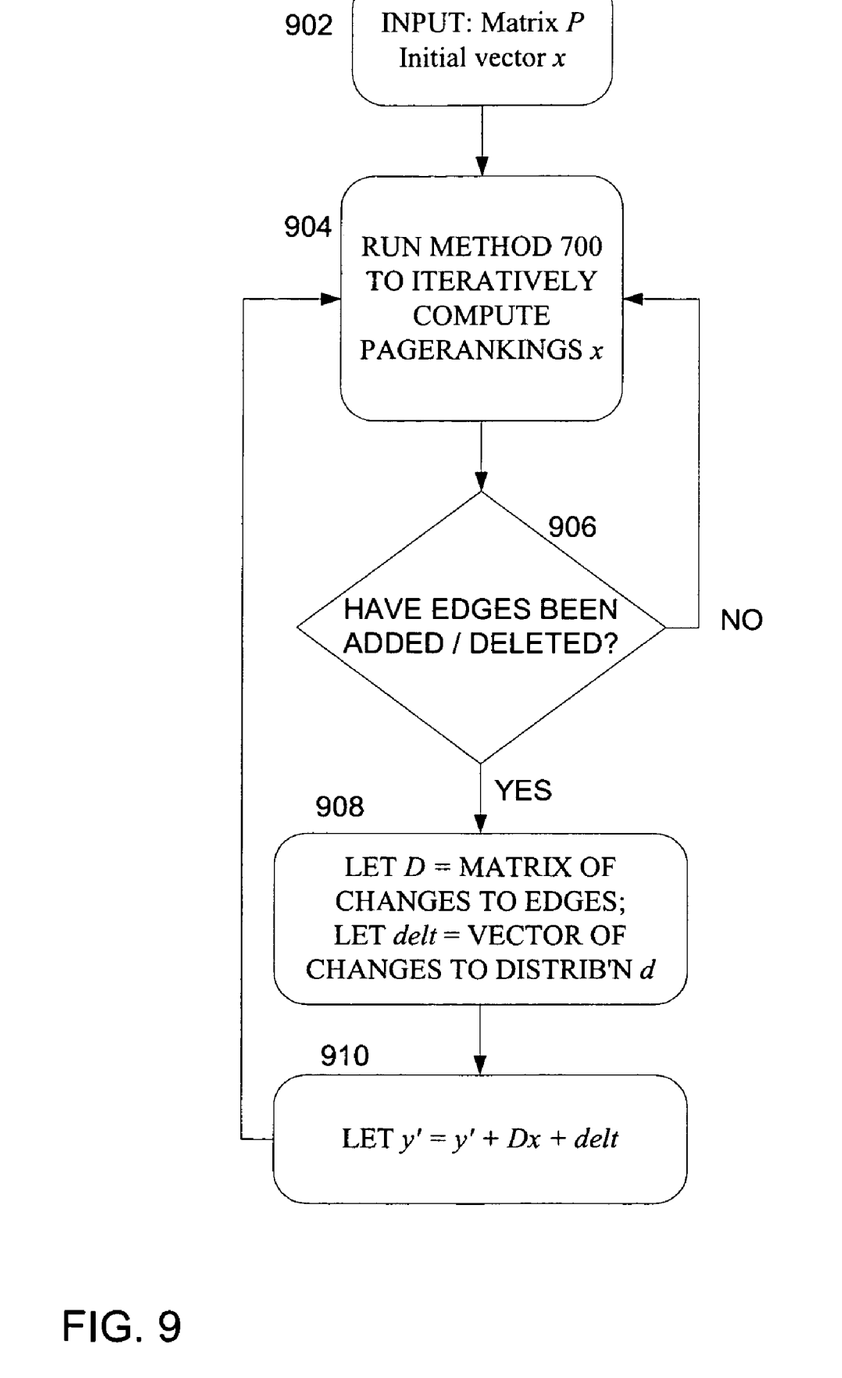
FIG. 9 is a flow diagram illustrating a illustrating a method for incrementally computing a vector of page rankings, in accordance with an embodiment of the invention.

An additional advantageous method of incrementally updating page rankings is provided by embodiments of the invention. If the page rank transition matrix changes from P to Q, one approach to computing the new page rankings is to use the method described with reference to FIG. 7, beginning with the previous page rankings x that were computed with respect to P. Although this approach converges quickly to the new page rankings, it requires an initial computation of error Qx−x that may be expensive. Embodiments of the invention therefore provide a method of inexpensively computing values needed to compute page rankings when a page rank transition matrix changes incrementally. With reference to FIG. 9, the method begins by inputting a page rank transition matrix P and an initial corresponding page ranking x at step 902. The method 700 described with reference to FIG. 7 is then run at step 904 to compute page rankings x. Embodiments check if edges have been added or deleted in the web graph, corresponding to the addition or removal of links between web pages, at step 906. If no changes have been made, the method continues with the computation of page rankings at step 904. Otherwise, the changes are stored as a matrix D of changes to the underlying random walk transition matrix of P, and a vector delt of changes to the distribution vector d at step 908. The value y'=y'+Dx+delt is then computed at step 910, and processing of page rankings continues at step 904.

Computing the page rankings incrementally using a method such as that described with reference to FIG. 9 offers at least two advantages over previously known methods of page rank computation. First, if the page rankings contain uniformly small error, then a small change to the transition matrix (i.e., a small number of page links are added or removed) results in page rank error values that are only large for a small number of pages. Selective updating procedures, as used in embodiments of the invention by selecting non-zero values of the updater z, work very well in such situations, and are thus very efficient for incremental work.

Second, without a method such as that described with reference to FIG. 9, it may be necessary to compute an initial error value (e.g., Qx−x) in an inefficient manner such as straightforward matrix multiplication. The techniques described above, as used in embodiments of the invention, obviate the need for such inefficient computation by quickly calculating an initial error value when the web graph changes incrementally.

In an embodiment of the invention, a central node manages the true values of the page rank vector x and the error vector y. Processing nodes act as processing caches of regions of x and y. Periodically, the processing nodes commit their changes by communicating to the central processing node. Should any node fail, other nodes assume responsibility for the unattended regions of the web graph until the node returns to service. New nodes can be added and assume responsibility for regions currently tended by other processing nodes, in order to improve the system's performance.

The application of the present invention is not confined to ranking web pages. The invention is equally applicable to any set of interconnected objects where "random walk" probabilities are to be determined with respect to an individual set of preferences. For example, the invention could be applied in ranking individuals within a social network, or in identifying important resources on an electrical grid or telecommunications network.

In view of the many possible embodiments to which the principles of the present invention may be applied, it should be recognized that the embodiments described herein with respect to the drawing figures are meant to be illustrative only and should not be taken as limiting the scope of the invention. For example, those of skill in the art will recognize that the illustrated embodiments can be modified in arrangement and detail without departing from the spirit of the invention. Although the invention is described in terms of software modules or components, those skilled in the art will recognize that such may be equivalently replaced by hardware components. Therefore, the invention as described herein contemplates all such embodiments as may come within the scope of the following claims and equivalents thereof.

What is claimed is:

1. A computer-readable storage medium including computer-executable instructions facilitating iterative updating of a ranking of one or more objects in a collection of interconnected ranked objects characterized by a random walk transition matrix A and a page transition matrix P, the computer-executable instructions comprising steps of:

selecting a vector x representing an approximation of the ranking of the one or more objects;

updating the ranking by, at each iteration:

selecting a subset of the collection of objects;

computing an update vector y' as a vector difference Px−x;

selecting a vector z representing a set of values for propagation through the collection of interconnected ranked objects;

modifying the vector x by adding to the vector x the vector z;

propagating the selected set of values to at least one other object in the collection and outside the subset; and storing as errors, for each other object in the collection, an effect of the propagation on each other object's ranking by modifying the update vector y' by adding to the update vector y' a vector difference Az−z; and using the updated ranking to generate search results.

2. The computer-readable storage medium of claim 1 wherein the objects are web pages.

3. The computer-readable storage medium of claim 1 wherein selecting the subset comprises selecting the same subset at each iteration.

4. The computer-readable storage medium of claim 1 wherein selecting the subset comprises choosing objects with relatively large stored error.

5. The computer-readable storage medium of claim 1 wherein the steps are executed by a first processing node, and farther comprising:

receiving errors produced by a second processing node; and applying the errors produced by the second processing node to the stored errors.

6. A computer implemented method for facilitating iterative updating of a ranking of one or more objects in a collection of interconnected ranked objects characterized by a random walk transition matrix A and a page transition matrix P wherein the method is executed by a processor, the method comprising:

selecting a vector x representing an approximation of the ranking of the one or more objects;

updating the ranking by, at each iteration:

selecting a subset of the collection of objects;

computing an update vector y' as a vector difference Px−x;

selecting a vector z representing a set of values for propagation through the collection of interconnected ranked objects;

modifying the vector x by adding to the vector x the vector z;

propagating the selected set of values to at least one other object in the collection and outside the subset; and storing as errors in memory, for each other object in the collection, an effect of the propagation on each other object's ranking by modifying the update vector y' by adding to the update vector y' a vector difference Az−z; and using the updated ranking to generate search results.

7. The method of claim 6 wherein the objects are web pages.

8. The method of claim 6 wherein selecting the subset comprises selecting the same subset at each iteration.

9. The method of claim 6 wherein selecting the subset comprises choosing objects with relatively large stored error.

10. The method of claim 6 wherein the steps are executed by a first processing node, and further comprising:

receiving errors produced by a second processing node; and applying the errors produced by the second processing node to the stored errors.

11. A system for facilitating iterative updating of a ranking of one or more objects in a collection of interconnected ranked objects characterized by a random walk transition matrix A and a page transition matrix P, the system comprising:

a processor operative to execute computer-executable instructions; and memory having stored therein computer-executable instructions for performing steps comprising:

selecting a vector x representing an approximation of the ranking of the one or more objects;

updating the ranking by, at each iteration:

selecting a subset of the collection of objects;

computing an update vector y' as a vector difference Px−x;

selecting a vector z representing a set of values for propagation through the collection of interconnected ranked objects;

modifying the vector x by adding to the vector x the vector z;

propagating the selected set of values to at least one other object in the collection and outside the subset; and storing as errors, for each other object in the collection, an effect of the propagation on each other object's ranking by modifying the update vector y' by adding to the update vector y' a vector difference Az−z; and using the updated ranking to generate search results.

12. The system of claim 11 wherein the objects are web pages.

13. The system of claim 11 wherein selecting the subset comprises selecting the same subset at each iteration.

14. The system of claim 11 wherein selecting the subset comprises choosing objects with relatively large stored error.

* * * * *